US010220876B2

(12) United States Patent
Krieger et al.

(10) Patent No.: US 10,220,876 B2
(45) Date of Patent: Mar. 5, 2019

(54) BEARING ASSEMBLY FOR THE BEARING OF A STEERING SHAFT

(71) Applicant: Robert Bosch Automotive Steering GmbH, Schwäbisch Gmünd (DE)

(72) Inventors: Jochen Krieger, Waldstetten (DE); Michael Hauck, Remshalden-Geradstetten (DE); Konstantin Auns, Urbach (DE); Andreas Ritter, Schwäbisch Gmünd (DE)

(73) Assignee: Robert Bosch Automotive Steering GmbH, Schwäbisch Gmünd (DE)

( * ) Notice: Subject to any disclaimer, the term of this patent is extended or adjusted under 35 U.S.C. 154(b) by 0 days.

(21) Appl. No.: 15/571,607

(22) PCT Filed: May 7, 2015

(86) PCT No.: PCT/EP2015/060106
§ 371 (c)(1),
(2) Date: Nov. 3, 2017

(87) PCT Pub. No.: WO2016/177432
PCT Pub. Date: Nov. 10, 2016

(65) Prior Publication Data
US 2018/0148091 A1  May 31, 2018

(51) Int. Cl.
*B62D 7/22* (2006.01)
*B62D 5/04* (2006.01)
(Continued)

(52) U.S. Cl.
CPC ............ *B62D 7/224* (2013.01); *B62D 5/0409* (2013.01); *F16C 19/54* (2013.01); *F16C 25/083* (2013.01);
(Continued)

(58) Field of Classification Search
CPC ....... B62D 7/224; B62D 5/0409; F16C 19/54; F16C 25/083; F16C 27/08
See application file for complete search history.

(56) References Cited

U.S. PATENT DOCUMENTS

| 6,782,967 | B2* | 8/2004 | Schafert | B62D 6/10 180/444 |
| 2007/0085291 | A1* | 4/2007 | Lee | B62D 7/224 280/90 |
| 2007/0216124 | A1* | 9/2007 | Wakabayashi | B62D 7/224 280/89 |
| 2007/0217722 | A1* | 9/2007 | Bohmann | B63H 23/321 384/248 |

(Continued)

FOREIGN PATENT DOCUMENTS

DE  10 2007 032 907 A1  5/2008
DE  10 2010 049 999 A1  5/2012
(Continued)

OTHER PUBLICATIONS

International Search Report corresponding to PCT Application No. PCT/EP2015/060106, dated Jan. 15, 2016 (German and English language document) (5 pages).

*Primary Examiner* — Tony H Winner
(74) *Attorney, Agent, or Firm* — Maginot, Moore & Beck LLP

(57) ABSTRACT

A bearing assembly for bearing a steering shaft includes a bearing housing, a bearing, and a damping disk. The housing has two housing sections. The bearing is integrated into the damping disk. The damping disk is positioned so that an inner wall of a first housing section radially supports a circumferential side of the damping disk, and such that a second housing section is axially supported by the damping disk.

11 Claims, 2 Drawing Sheets

(51) Int. Cl.
*F16C 19/54* (2006.01)
*F16C 25/08* (2006.01)
*F16C 27/06* (2006.01)
*F16C 27/08* (2006.01)
*F16F 13/00* (2006.01)
*F16F 15/12* (2006.01)
*F16F 15/123* (2006.01)

(52) U.S. Cl.
CPC ............ *F16C 27/066* (2013.01); *F16C 27/08* (2013.01); *F16F 13/005* (2013.01); *F16F 15/1201* (2013.01); *F16F 15/12353* (2013.01); *F16C 2326/24* (2013.01)

(56) References Cited

U.S. PATENT DOCUMENTS

| | | | |
|---|---|---|---|
| 2011/0163525 A1 | 7/2011 | Aoki | |
| 2015/0107384 A1* | 4/2015 | Kwon | B62D 3/04 74/89.14 |
| 2015/0298733 A1* | 10/2015 | Moriyama | B62D 5/0409 180/444 |
| 2016/0319859 A1* | 11/2016 | Omori | F16O 17/042 |
| 2018/0065656 A1* | 3/2018 | Yun | B62D 5/0403 |

FOREIGN PATENT DOCUMENTS

| | | |
|---|---|---|
| DE | 10 2011 050 683 A1 | 11/2012 |
| DE | 10 2014 105 825 A1 | 10/2015 |
| EP | 1 813 507 A1 | 8/2007 |
| EP | 2 351 681 A1 | 8/2011 |

\* cited by examiner

BEARING ASSEMBLY FOR THE BEARING OF A STEERING SHAFT

This application is a 35 U.S.C. § 371 National Stage Application of PCT/EP2015/060106, filed on May 7, 2015, the disclosure of which is incorporated herein by reference in its entirety.

The disclosure relates to a bearing assembly for bearing a steering shaft or a shaft section, coupled to the steering shaft in terms of rotation, of a steering device.

BACKGROUND

The prior art includes steering devices for vehicles having a steering shaft by means of which the driver specifies a desired steering angle, having a steering gear, in which the steering shaft movement is transmitted via a pinion to a rack to control the rotatable wheels, and having an electric servo motor for steering assistance. To determine the steering torque which the driver is applying to the steering shaft, use is made of a sensor arrangement with a torque measuring unit, by means of which a relative rotation between two shaft sections of the steering shaft is determined. A steering device of this kind is known from DE 10 2007 032 907 A1, for example.

The steering shaft is rotatably mounted, wherein, owing to the vehicle movement, the bearings are subject to high loads, which lead to the development of noise and to impaired steering behavior in the case where there is bearing play.

It is the underlying object of the disclosure to improve the development of noise and the steering behavior in a steering device by simple design measures.

This object is achieved by means of this disclosure. The claims, description, and drawings describe expedient developments.

The bearing assembly according to the disclosure is used to bear a steering shaft or a shaft section, coupled to the steering shaft in terms of rotation, of a steering device for a vehicle. By way of the steering shaft, the driver specifies a steering torque and a steering angle, which is transmitted via a steering gear to a steering rack to control the rotatable wheels. The steering shaft is rotatably mounted in the bearing assembly and, for this purpose, the bearing assembly has at least one bearing in a bearing housing. In the bearing housing there is furthermore a damping disk, into which the bearing is integrated and which is supported radially by means of its circumferential side on the housing inner wall of the bearing housing, wherein one housing section is supported in the axial direction on the damping disk.

The damping disk thus has a dual damping function: on the one hand in the radial direction and, on the other hand, in the axial direction. In the radial direction, the damping disk, which accommodates the bearing, supports the steering shaft on the housing inner wall and thus stabilizes the steering shaft. In the axial direction, support takes place between a first housing section of the bearing housing and the damping disk, which is accommodated in a second housing section of the bearing housing. The two housing sections of the bearing housing can, if appropriate, form an axial movement relative to one another, which can be of the order of the housing clearance which usually occurs. Owing to the axial support of the housing section on the damping disk, shocks and impacts, one component of which acts in the axial direction of the steering shaft, are damped in an effective manner, for example.

The housing section supported axially on the damping disk is, for example, a housing cover, which rests on a pot-shaped main housing and is situated on the side facing away from the steering gear in the installed position. If the vehicle is subject to appropriate excitation in relation to the axial direction of the steering shaft, a component in the vehicle or the steering device, which component is in contact with the housing cover or the housing base body, can exert an impulse on the relevant housing section, and this impulse is damped by means of the damping disk.

The housing section which is supported axially on the damping disk can be supported either directly or indirectly—via another component, e.g. a spring element—on the damping disk. Via the spring element, force spikes during an impact excitation in the axial direction are avoided or at least reduced. The spring element is embodied as a wave spring, a diaphragm spring, a spiral spring or in some other way as a spring element, for example. The damping disk and the spring element can be embodied either as a coherent one-piece assembly module or as two individual parts.

According to an advantageous embodiment, the damping disk is composed at least partially of a vibration- and impulse-damping material. According to a preferred embodiment, the damping disk has an inner disk composed of harder material and an outer ring composed of softer material, which is supported on the inside of the housing and is connected to the inner disk. The outer ring is mounted on the circumferential side of the inner disk, being molded directly onto the inner disk, for example.

The inner disk is composed of a hard component, e.g. steel, aluminum, fiber-reinforced plastic or the like, and accommodates the bearing. The outer ring forms the soft component and is mounted as an O-ring, rubber mat, felt or injection-molded soft plastic, for example, on the circumference of the inner disk. According to an advantageous embodiment, the damping disk is embodied as a two-component plastic disk, where the inner disk is made from a fiber-reinforced hard component and the outer ring is embodied as an integrated soft component molded directly onto the circumference.

The spring element via which a housing section is supported on the damping disk preferably engages on the inner disk, composed of harder material, of the damping disk. The damping effect in the axial direction arises from the fact that the damping disk rests on the housing inner wall of one housing section with an ability for axial relative movement at least of the order of a bearing play, thus allowing the damping disk to move slightly axially relative to the housing section when subject to an axial impulse. In the embodiment of the damping disk with a harder inner disk and a softer outer ring, the outer ring is in direct contact with the housing inner wall, wherein a relative movement generally takes place in the material of the softer outer ring.

According to another expedient embodiment, the bearing integrated into the damping disk is designed as a floating bearing, in which the steering shaft or the shaft section is supported in the radial direction but is accommodated movably in the axial direction. According to another expedient embodiment, there is a second bearing in the bearing assembly, said bearing being integrated into the bearing housing at an axial distance from the first bearing. The second bearing is advantageously designed as a fixed bearing with radial and axial guidance of the shaft. Between the first and the second bearing, it is possible to arrange a helical gear, which meshes with a servo unit, in particular an electric servo motor. The servo torque generated by the servo unit is introduced into the steering shaft via the helical gear. The arrangement of the helical gear axially between the first bearing or damping disk and the second bearing allows compact embodiment of the bearing assembly.

The bearing assembly is part of the steering device for a vehicle and is arranged axially between the steering gear and the manual steering device to be actuated by the driver.

BRIEF DESCRIPTION OF THE DRAWINGS

Further advantages and expedient embodiments can be found in the further claims, the description of the figures and the drawings, in which:

DETAILED DESCRIPTION

In the figures, identical components are provided with identical reference signs.

Figure 1:
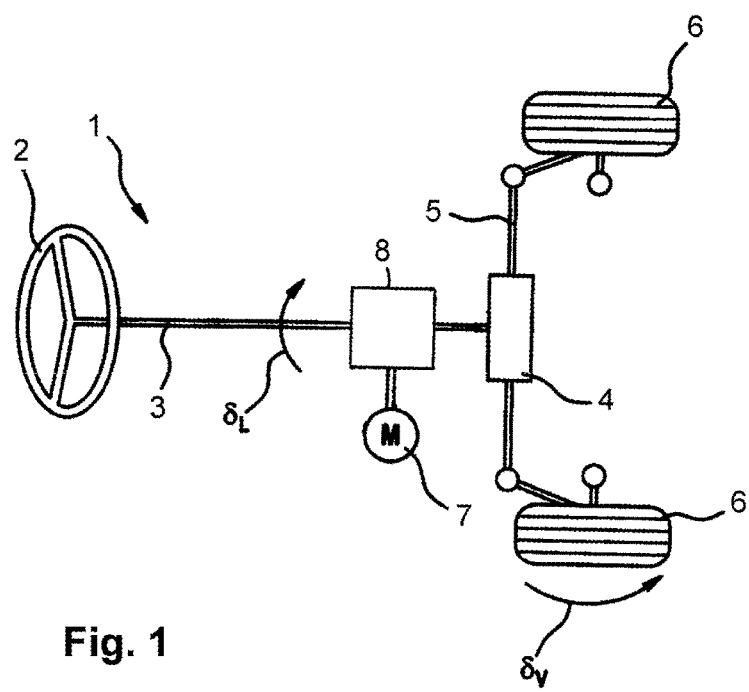
FIG. 1 shows a schematic illustration of a steering device in a vehicle.

The steering device 1 illustrated in FIG. 1 comprises a steering wheel 2, a steering spindle or shaft 3, a steering housing 4 with a steering gear accommodated therein, and a steering linkage with a steering rack 5, via which a steering movement is transmitted to the steerable wheels 6 of the vehicle. Via the steering wheel 2, to which the steering shaft 3 is connected in a fixed manner, the driver specifies a steering angle $\delta_L$, which is transmitted in the steering gear, in the steering housing 4, to the steering rack 5 of the steering linkage, whereupon a wheel steering angle $\delta V$ is set at the steerable wheels 6.

To assist the manual torque applied by the driver, an electric servo motor 7 is provided, by means of which a servo torque can be fed in to assist steering. Instead of an electric servo motor, it is also possible to provide a hydraulic assistance device, e.g. a hydraulic pump, which is driven by an internal combustion engine.

The assisting servo torque of the electric servo motor 7 is fed into the steering shaft 3 in the region of the bearing assembly 8. The bearing assembly 8 has two bearings for bearing the steering shaft 3, and furthermore has a helical gear or gearwheel, which is coupled to the steering shaft 3 in terms of rotation and is driven by the electric servo motor 7.

Figure 2:
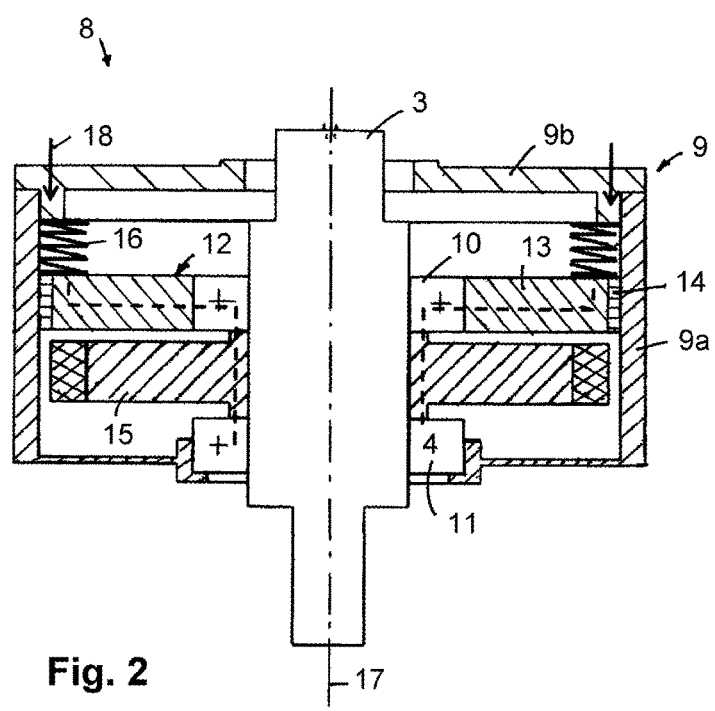
FIG. 2 shows a section through a bearing assembly for bearing the steering shaft.

A section through the bearing assembly 8 is shown in FIG. 2. The bearing assembly 8 has a floating bearing 10 and a fixed bearing 11 in a bearing housing 9 having a pot-shaped main housing 9a and a housing cover 9b, which each form housing sections. The floating bearing 10 is accommodated in a damping disk 12, which comprises an inner disk 13 and an outer ring 14, which is arranged on the circumference of the inner disk and by means of which the damping disk 12 rests against the housing inner wall of the pot-shaped main housing 9a. The inner disk 13 is composed of a hard component, and the outer ring 14 is composed of a soft component, which has a vibration-damping effect. For example, the damping disk 12 can be embodied as a two-component plastic disk, in which the inner disk 13 is composed of a fiber-reinforced hard component and the outer ring 14, in the form of a component molded directly onto the circumference of the inner disk 13, is composed of a soft component. The outer ring 14 has a significantly smaller radial extent than the inner disk 13.

The damping disk 12 is situated on the side facing the housing cover 9b, and the fixed bearing 11 rests on the bottom of the pot-shaped main housing 9a. Between the fixed bearing 11 and the damping disk 12 there is a helical gear 15, which is coupled for conjoint rotation to the shaft 3 and is acted upon by the electric servo motor 7 (FIG. 1) for feeding in an assisting servo torque. The helical gear 15 is supported axially both on the fixed bearing 11 and on the floating bearing 10.

The housing cover 9b rests on the end face of the pot-shaped main housing 9a and is supported on the lateral surface of the damping disk 12 via a spring element 16. The spring element 16 can be embodied as a spiral spring, but other versions of spring also come into consideration, e.g. round-wire or flat-wire wave springs or diaphragm springs.

The damping disk 12 thus performs a damping function both in the radial direction and in the axial direction—relative to the longitudinal axis 17 of the shaft 3. The damping outer ring 14 of the damping disk 12 rests directly against the housing inner wall of the pot-shaped main housing 9a and, in this way, can damp both vibrations in the radial direction and in the axial direction in an effective manner. In the axial direction, as indicated by the arrows 18, impulses are introduced into the bearing assembly 8 via the housing cover 9b, for example, said impulses being introduced via the spring element 16 into the damping disk 12, which is supported via the damped outer ring 14 on the main housing 9a. The spring element 16 can reduce force spikes in the axial forces 18, and, via the damping disk 12, there is a reduction in the axial vibrations. In corresponding fashion, vibrations and excitations which act in the radial direction are also damped.

LIST OF REFERENCE SIGNS

1 steering device
2 steering wheel
3 steering shaft
4 steering housing
5 steering linkage
6 front wheel
7 electric servo motor
8 bearing assembly
9 bearing housing
9a main housing
9b housing cover
10 floating bearing
11 fixed bearing
12 damping disk
13 inner disk
14 outer ring
15 helical gear
16 spring element
17 longitudinal axis
18 arrow

The invention claimed is:

1. A bearing assembly, comprising:
   a bearing housing including two housing sections; and
   a damping disk positioned in the bearing housing such that an inner wall of a first of the two housing sections radially supports a circumferential side of the damping disk, and such that the damping disk axially supports a second of the two housing sections; the damping disk including a bearing.

2. The bearing assembly as claimed in claim 1, further comprising: a spring element that axially supports the second of the two housing sections on the damping disk.

3. The bearing assembly as claimed in claim 1, wherein the damping disk further includes an inner disk and an outer ring, the inner disk composed of a harder material relative to a softer material that composes the outer ring, and the outer ring supported on an inside of the housing.

4. The bearing assembly as claimed in claim 3, wherein the damping disk is embodied as a two-component disk.

5. The bearing assembly as claimed in claim 3, further comprising:
a spring element that axially supports the second of the two housing sections on the damping disk, wherein the spring element is supported on the inner disk.

6. The bearing assembly as claimed in claim 1, wherein the bearing is a floating bearing positioned in the damping disk.

7. The bearing assembly as claimed in claim 1, further comprising:
a second bearing integrated into the bearing housing at an axial distance from the first bearing.

8. The bearing assembly as claimed in claim 7, wherein the second bearing is a fixed bearing.

9. The bearing assembly as claimed in claim 7, further comprising:
a helical gear configured to fixedly connect to a steering shaft or to a shaft section of a steering shaft, the helical gear configured to transmit a torque of a servo unit to the steering shaft or the shaft section, and the helical gear positioned axially between the damping disk and the second bearing.

10. A steering device for a vehicle, comprising:
a steering shaft or a shaft section coupled to a steering shaft
a bearing assembly for bearing the steering shaft or the shaft section, the bearing assembly including:
a bearing housing having two housing sections; and
a damping disk positioned in the bearing housing such that an inner wall of a first of the two housing sections radially supports a circumferential side of the damping disk, and such that the damping disk axially supports a second of the two housing sections; the damping disk including a bearing.

11. The bearing assembly as claimed in claim 1, wherein the bearing assembly is configured to rotationally bear a steering shaft or a shaft section coupled to a steering shaft of a steering device.

* * * * *